March 1, 1960     A. G. LAUCK     2,926,458
COLORED GLASS FRIT FEEDER

Filed Dec. 13, 1955     3 Sheets-Sheet 1

INVENTOR
A. G. LAUCK
BY
ATTORNEYS

March 1, 1960 A. G. LAUCK 2,926,458
COLORED GLASS FRIT FEEDER
Filed Dec. 13, 1955 3 Sheets-Sheet 2

INVENTOR
A. G. LAUCK
BY
Rule and Hoge
ATTORNEYS

March 1, 1960 A. G. LAUCK 2,926,458
COLORED GLASS FRIT FEEDER

Filed Dec. 13, 1955 3 Sheets-Sheet 3

INVENTOR
A. G. LAUCK
BY
ATTORNEYS

United States Patent Office 2,926,458
Patented Mar. 1, 1960

2,926,458

COLORED GLASS FRIT FEEDER

Albert G. Lauck, Toledo, Ohio, assignor to Owens-Illinois Glass Company, a corporation of Ohio Application December 13, 1955, Serial No. 552,869

4 Claims. (Cl. 49—54)

My invention relates to the manufacture of glass and provides means for feeding glass color material in comminuted small particle form and delivering it to molten glass for mixture therewith.

An object of the invention is to provide improved means for conveying the powdered or granulated color material, such means in its preferred form comprising a screw conveyor with a double thread or rib for insuring a positive feed of the material.

A further object of the invention is to provide novel means for distributing the color material according to a predetermined pattern of distribution over the surface of the molten glass to which it is delivered. Such means includes water cooled baffles positioned over and adjacent to the molten glass.

An object of the invention attained by the use of such water cooled baffles is to overcome a difficulty which has been encountered in connection with the use of baffles adjacent the molten glass. The high temperature to which the baffles and color material are subjected results in a softening or partial fusing of the powdered material causing it to stick together and accumulate on the baffles, thus clogging the apparatus. In accordance with the present invention the baffles are in the form of pipes through which a cooling fluid is circulated thereby overcoming such difficulty.

Further objects of the invention and the exact nature thereof will appear more fully hereinafter in connection with the following detailed description.

Referring to the accompanying drawings.

Figure 1:
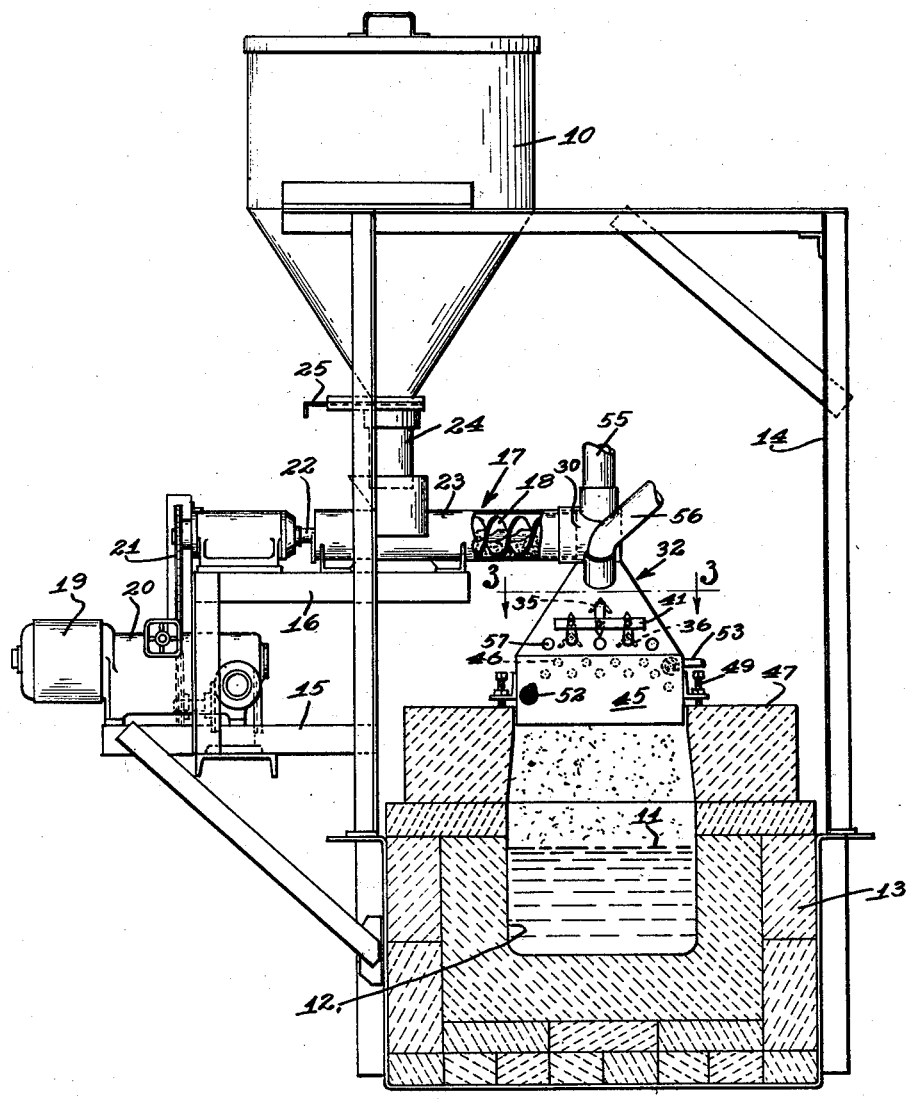
Fig. 1 is a part sectional elevational view of the apparatus.

Referring to Fig. 1, the apparatus is designed for feeding glass coloring material or frit in granulated or powdered form from a hopper or container 10 and distributing it over the surface of molten glass 11 flowing through a channel 12. The channel extends lengthwise through a forehearth 13 of the glass melting and refining tank of a continuous type furnace. The hopper 10 is supported on a frame 14 which also provides a support for platforms 15 and 16. A screw conveyor mechanism 17 is mounted on the platform 16, such mechanism including a spiral or screw conveyor 18. The conveyor is driven by an electric motor 19 having driving connection with the conveyor through a speed reduction unit 20 mounted on the platform 15. Driving connections include a sprocket chain 21 and gears for driving the conveyor shaft 22. The spiral conveyor is mounted in a tubular casing or conduit 23. The coloring material is fed by gravity from the hopper 10 through a spout 24 to the screw conveyor. The rate of feed is adjustably controlled by an adjustable gate 25.

Figure 2:
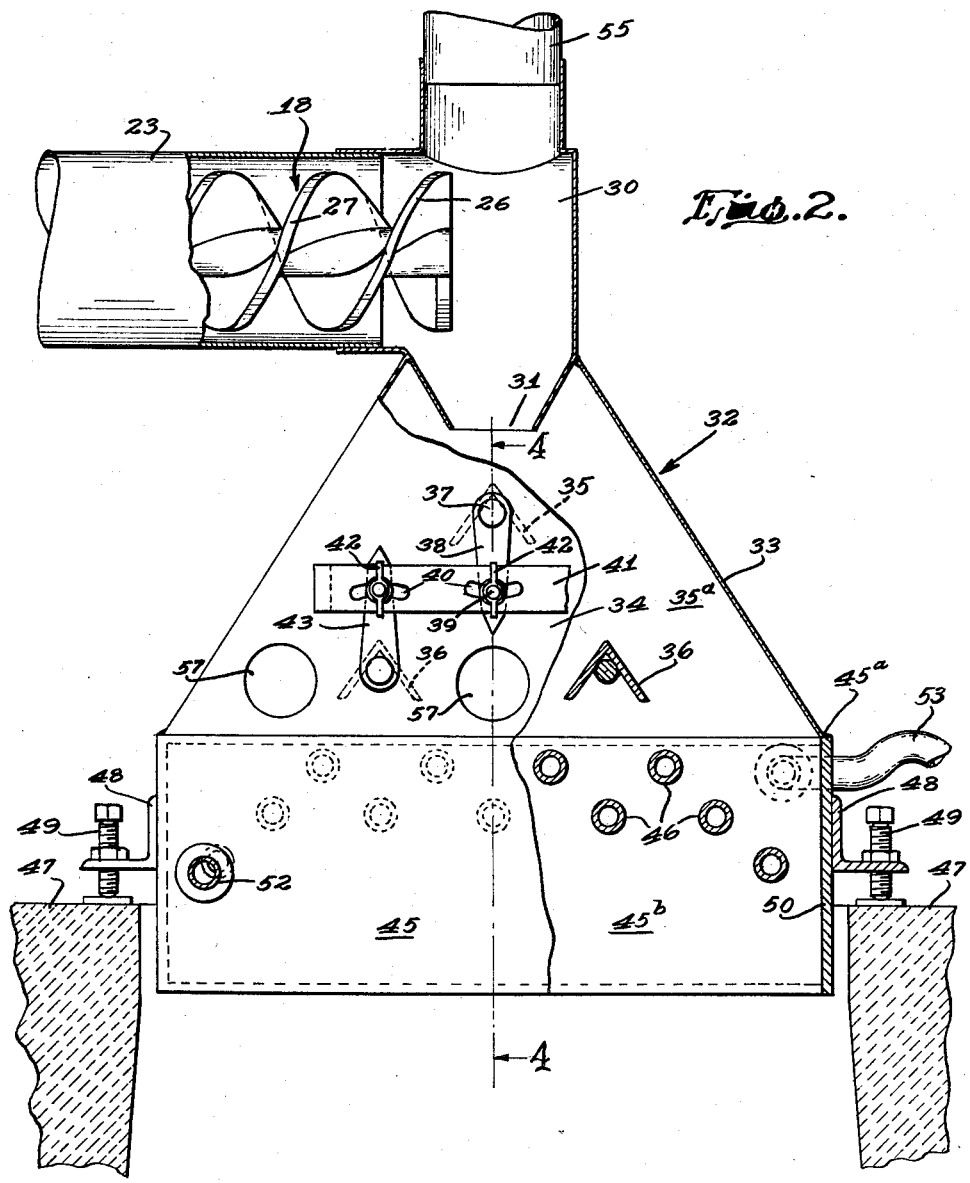
Fig. 2 is an elevational view with parts broken away and parts in section, showing the baffles and their mounting, the section being at the line 2—2 on Fig. 3.
Figure 3:
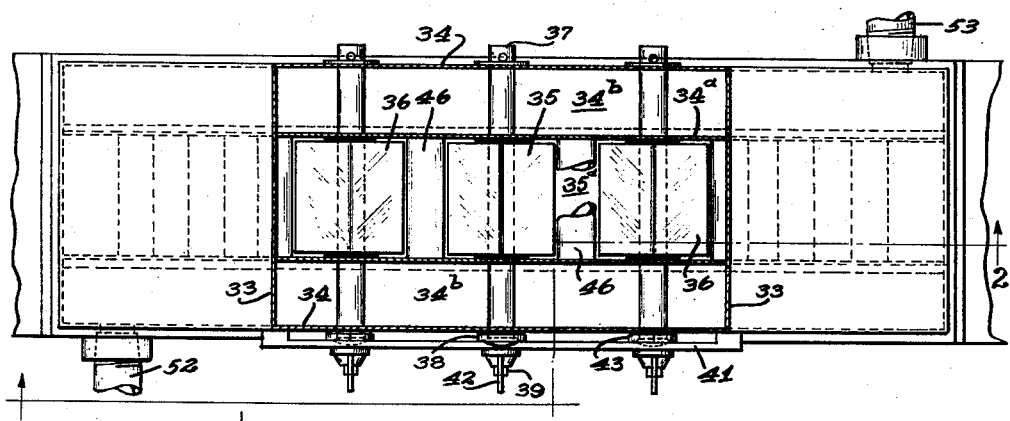
Fig. 3 is a section at the line 3—3 on Fig. 1.
Figure 5:
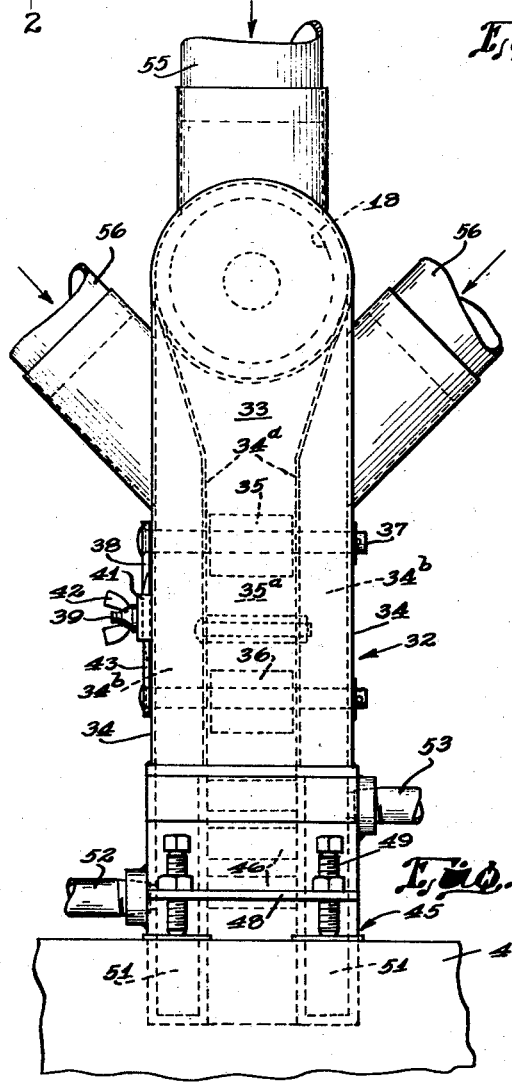
Fig. 5 is an elevational view of the parts shown in Fig. 2, looking in a direction at right angles to that of Fig. 2.

In practice, the coloring material or frit as supplied commercially, usually consists of a mixture of finely powdered material and coarser material in granulated or larger particle form. With a spiral or screw feeder of usual form there is slippage between the material and the screw which interferes with positive and uniform feeding of the material. In the present invention the spiral feeder comprises a double thread construction including separate threads or ribs 26 and 27 (Fig. 2). This double thread overcomes the difficulty and insures substantially positive and uniform feeding of the material and also has a mixing action tending to remix coarser and finer particles of the material which have become segregated.

The delivery end of the spiral feeder is directly over the glass 11 flowing through the forehearth. The color material is delivered from the spiral feeder to a surrounding compartment 30 or chamber and drops by gravity through an opening 31 within a hood 32 which encloses baffles for distributing the material over the surface of the glass. The hood 32 has inclined downwardly divergent end walls 33 and parallel side walls 34. Baffles mounted within the hood 32 include an upper central baffle 35 and baffles 36. These baffles are of inverted V form. The upper baffle 35 is fixed to a rock shaft 37 to which is also fixed a downwardly extending rock arm 38 for adjusting the baffle rotatively about the axis of the shaft 37. The baffle is held in adjusted position by a clamping screw 39 and wing nut 42. The screw is attached to the rock arm and extends through a slot 40 formed in a strip 41 attached to the wall 34. The lower baffles 36 are also individually adjustable, the adjusting means being substantially like that just described in connection with the upper baffle except that the rock arms 43 are extended upwardly from the rock shafts.

The hood 32 enclosing the baffles 35 and 36, includes inner walls 34ª parallel with and spaced inwardly from the walls 34 thereby providing vertical channels 34ᵇ through which air is circulated as presently described. Between the inner walls 34ª is a compartment or channel 35ª containing the baffles 35 and 36.

Figure 4:
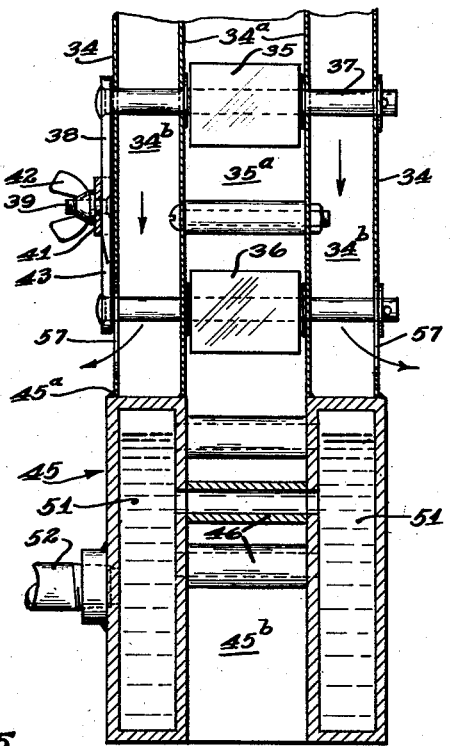
Fig. 4 is a section at the line 4—4 on Fig. 2.

Directly beneath the hood 32 and forming a continuation thereof is a rectangular section 45 providing part of a cooling system for an additional series of baffles 46 in the form of pipes mounted in the section 45. This section may be integrally united with the hood section 32 by means of spot welding 45ª (Fig. 4). The section 45 is open at top and bottom, thus providing an open channel 45ᵇ forming a continuation of the channel 35ª, thereby providing an open passageway through which color material, distributed by the baffles, drops to the surface of the molten glass 11 directly beneath.

The structure in which the baffles are mounted is supported on refractory blocks 47 mounted on the forehearth 13. This structure is adjustable up and down and for leveling by means of adjusting screws 49 threaded through angle bars 48 attached to the end walls 50 of the section 45. Water or other cooling fluid is circulated through the pipes 46 for keeping the temperature down and thereby preventing the powdered color material from softening and adhering to the baffles and accumulating thereon. The pipes 46 open into cooling chambers 51 formed in the sides of the section 45. The water enters through an inlet 52 and after passing through the pipes 46 is discharged through an overflow pipe 53.

A downward draft of air is applied to the color material as it is discharged from the spiral conveyor. The air under pressure is supplied through a pipe 55 which opens into the chamber 30 at a point above the discharge end of the spiral conveyor. The air passes downward through the channels 35ª, 45ᵇ and assists in carrying the powdered color material downward and distributing it over the surface of the glass. Air under pressure is also supplied through lateral pipes 56 which open into the side channels 34$^b$ and is discharged through openings 57 in the side walls 34. This air pressure counteracts any tendency for upward drafts of air through the channels 34$^b$.

Modifications may be resorted to within the spirit and scope of my invention.

I claim:

1. The combination of a forehearth channel of a glass furnace through which molten glass is caused to flow, feeder means for discharging glass coloring material in a finely divided form at a discharge outlet spaced above the glass in said channel, distributing means interposed between said discharge outlet and the glass surface for spreading the discharged material before said material reaches the molten glass surface, said distributing means including a plurality of baffles arranged in superposed horizontal rows at different levels with the baffles in each row parallel with and in staggered relation to those at adjoining levels in an inverted V formation, the baffles having downwardly flared walls in inverted V form in cross-section for guiding and spreading the material, means for pivotally mounting said baffles, and adjusting means individual to the baffles for setting the baffles to effect distribution of the material over the width of the forehearth channel, each said adjusting means comprising a rocker arm means connected to each baffle mounting means and means for locking the rocker arm means in adjusted position.

2. The combination defined in claim 1, including means for directing air under pressure downwardly against the coloring material discharged by the feeder means at its discharge outlet for impelling said material past the said distributing means and onto the molten glass surface.

3. Apparatus for supplying glass coloring material in comminuted form to molten glass in a forehearth channel through which said glass flows, comprising a hood overlying said channel, said hood having inner and outer walls spaced to provide air channels for the circulation of air, means for directing air under pressure into said air channels, means for feeding said colorant material into the hood, said means including a discharge outlet operatively connected with the hood, a series of horizontal baffles interposed between said discharge outlet and the glass in the forehearth channel, means for pivotally mounting said baffles to extend between said inner walls of the hood, said series comprising baffles at different levels and arranged in inverted V formation with all of the baffles parallel and with the uppermost baffle directly beneath the said discharge opening so that the material as it descends is progressively spread over a greater area by the baffles at each succeeding level, adjusting means individual to each of the baffles of said series for rotatively adjusting them, each adjusting means comprising a rocker arm means connected to each baffle mounting means, means for locking the rocker arm means in adjusted position, a downwardly extended portion of the hood extending below said baffles and air channels, supplemental baffles mounted in said extended hood portion below the series of horizontal baffles, the individual supplemental baffles being pipes extending transversely of said hood, said extended portion of the hood having inner and outer walls spaced to provide cooling chambers opening into said pipes to form a cooling system, and means providing inlet and outlet channels through which a cooling fluid is directed to and from said cooling system.

4. The apparatus defined in claim 3, including means for directing air under pressure into said hood downwardly against the coloring material discharged into said hood by the feeding means at its discharge outlet.

References Cited in the file of this patent

UNITED STATES PATENTS

| | | |
|---|---|---|
| Re. 20,828 | Powell | Aug. 16, 1938 |
| 121,588 | Chichester | Dec. 5, 1871 |
| 554,562 | Williams | Feb. 11, 1896 |
| 722,812 | Cogswell | Mar. 17, 1903 |
| 1,399,046 | Bowman | Dec. 6, 1921 |
| 1,492,013 | Barks | Apr. 29, 1924 |
| 1,542,647 | Sparks | June 30, 1925 |
| 1,992,994 | Delpech | Mar. 5, 1935 |
| 2,212,358 | Weekley | Aug. 20, 1940 |
| 2,624,475 | Henry et al. | Jan. 6, 1953 |
| 2,658,743 | Speil et al. | Nov. 10, 1953 |